United States Patent
Shaheen et al.

(10) Patent No.: US 7,173,924 B2
(45) Date of Patent: Feb. 6, 2007

(54) METHOD AND APPARATUS FOR DELIVERY OF UNIVERSAL MOBILE TELECOMMUNICATIONS SYSTEMS (UMTS) BASED UNIDIRECTIONAL SERVICES OVER A WIRELESS LOCAL AREA NETWORK (WLAN)

(75) Inventors: Kamel M. Shaheen, King of Prussia, PA (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/872,682

(22) Filed: Jun. 21, 2004

(65) Prior Publication Data

US 2004/0228312 A1   Nov. 18, 2004

Related U.S. Application Data

(63) Continuation of application No. 10/302,143, filed on Nov. 22, 2002.

(60) Provisional application No. 60/399,349, filed on Jul. 29, 2002.

(51) Int. Cl.
  H04Q 7/24    (2006.01)
  H04L 12/28   (2006.01)
  H04J 3/16    (2006.01)
(52) U.S. Cl. .................. 370/338; 370/401; 370/466
(58) Field of Classification Search .......... 370/338, 370/392, 400, 465, 466, 467
See application file for complete search history.

(56) References Cited

U.S. PATENT DOCUMENTS

| | | | |
|---|---|---|---|
| 5,796,727 | A | 8/1998 | Harrison et al. |
| 5,890,055 | A | 3/1999 | Chu et al. |
| 5,946,629 | A | 8/1999 | Sawyer et al. |
| 5,946,634 | A | 8/1999 | Korpela |
| 6,151,495 | A | 11/2000 | Rune |
| 6,181,683 | B1 | 1/2001 | Chevillat et al. |
| 6,259,898 | B1 | 7/2001 | Lewis |
| 6,385,451 | B1 | 5/2002 | Kalliokulju et al. |

(Continued)

FOREIGN PATENT DOCUMENTS

CN   1304587 A   7/2001

(Continued)

OTHER PUBLICATIONS

ETSI TR 101 957 v1.1., "Bran; Hiperlan Type 2; Requirements and Architecture for Interworking Between HIPERLAN/2 and 3rd Generation Cellular Systems", European Telecommunications Standards Institute, Aug. 2001.

(Continued)

*Primary Examiner*—Andrew C. Lee
(74) *Attorney, Agent, or Firm*—Volpe and Koenig, P.C.

(57) ABSTRACT

Method and apparatus for delivery of UMTS services to a dual mode mobile station through a WLAN when the mobile station is operating within a WLAN environment. UMTS services are transmitted to a WLAN through a UMTS repeater tuned to receive services addressed to registered IDs and transmit these services to that (those) WLAN(s) having mobile stations registered with the UMTS. The WLAN format converter converts the UMTS format into a WLAN message format and communicates the message to the registered users.

7 Claims, 2 Drawing Sheets

U.S. PATENT DOCUMENTS

| | | | |
|---|---|---|---|
| 6,393,261 | B1 | 5/2002 | Lewis |
| 6,650,899 | B1* | 11/2003 | Stumpert .................... 455/436 |
| 6,735,443 | B2* | 5/2004 | Chandra et al. ............ 455/436 |
| 6,763,012 | B1* | 7/2004 | Lord et al. .................. 370/338 |
| 6,763,236 | B2* | 7/2004 | Siren .......................... 455/450 |
| 6,785,535 | B2* | 8/2004 | Lucidarme et al. ......... 455/406 |
| 6,795,437 | B1* | 9/2004 | Rasanen et al. ......... 370/395.1 |
| 6,807,417 | B2* | 10/2004 | Sallinen et al. .......... 455/432.1 |
| 6,834,050 | B1 | 12/2004 | Madour et al. |
| 6,904,055 | B2* | 6/2005 | Pichna et al. ............... 370/467 |
| 7,010,305 | B2* | 3/2006 | Immonen et al. ........ 455/452.2 |
| 7,046,998 | B2* | 5/2006 | Verma et al. ............... 455/418 |
| 7,050,800 | B2* | 5/2006 | Shaheen et al. ......... 455/426.2 |
| 2002/0037717 | A1 | 3/2002 | Laube et al. |
| 2005/0239461 | A1* | 10/2005 | Verma et al. ............. 455/435.1 |
| 2005/0254469 | A1* | 11/2005 | Verma et al. ............... 370/338 |
| 2006/0050667 | A1* | 3/2006 | Verma et al. ............... 370/338 |

FOREIGN PATENT DOCUMENTS

| | | | |
|---|---|---|---|
| CN | 1304587 | A | 7/2001 |
| EP | 1085773 | A | 9/1999 |
| EP | 1085773 | A | 9/1999 |
| KR | 2001-86611 | | 9/2001 |
| WO | 01/72076 | | 9/2001 |
| WO | 02/07379 | | 1/2002 |
| WO | 02/15598 | A | 2/2002 |
| WO | 0215598 | A | 2/2002 |
| WO | 02/043272 | | 5/2002 |
| WO | 02/43272 | | 5/2002 |
| WO | 0243272 | | 5/2002 |
| WO | 02/103929 | | 12/2002 |
| WO | 02/103929 | A1 | 12/2002 |
| WO | 02103929 | A1 | 12/2002 |

OTHER PUBLICATIONS

Tsao et al., "Design and Evaluation of UMTS-WLAN Interworking Strategies", IEEE, pp. 777-781, Mar. 2002.

Bertin et al., "Concepts for IP-based Radio Interference in the BRAIN Framework", IEEE, 2000, pp. 437-444.

Lenzini et al., "Performance Evaluation of HiperLAN Type 2 with Voice and Web Data Traffic", Proceedings of the 34th Hawaii International Conference on System Sciences, 2001, IEEE, pp. 1-10.

* cited by examiner

METHOD AND APPARATUS FOR DELIVERY OF UNIVERSAL MOBILE TELECOMMUNICATIONS SYSTEMS (UMTS) BASED UNIDIRECTIONAL SERVICES OVER A WIRELESS LOCAL AREA NETWORK (WLAN)

CROSS REFERENCE TO RELATED APPLICATION(S)

This application is a continuation of U.S. patent application Ser. No. 10/302,143, filed Nov. 22, 2002, which in turn claims priority from U.S. Provisional Patent Application Ser. No. 60/399,349, filed Jul. 29, 2002, which are incorporated by reference as if fully set forth.

FIELD OF INVENTION

The present invention relates to wireless communication systems. More particularly, the present invention relates to method and apparatus for unidirectional delivery of services.

BACKGROUND

The present invention has the objective of delivering UMTS based services while a mobile station is attached to a wireless local area network (WLAN) system.

The applicant is unaware of any prior art capability of supporting such activities.

SUMMARY

The present invention is employed within a wireless communication system characterized by comprising a UMTS receiver that acts as a repeater for UMTS signals and a format converging unit for translating between UMTS formats and WLAN formats. The invention is employed within a network having both a UMTS system and a WLAN system. The system accommodates stand-alone mobile stations having a dual mode capability of selectively operating in UMTS and WLAN environments. A mobile station (UE) operating in the WLAN environment registers with the WLAN system and provides its UMTS identification for tracking UMTS traffic.

The WLAN forwards the mobile station identification (ID) to the UMTS receiver unit which is tuned for any activities involving the mobile station (UE). The UMTS receiver forwards any traffic, for example, paging messages, short message service (SMS), multimedia message service (MMS) and so forth, addressed to one of the registered mobile stations in the associated WLAN system serving the registered mobile stations. Traffic is forwarded to a unit that translates the message formats of the received traffic (flows) into WLAN formats which is then forwarded to the WLAN system. The WLAN system then forwards the traffic to the corresponding access point (AP) serving the mobile station.

The UMTS receiver forwards any traffic (e.g., paging messages, short message service (SMS) multimedia message service (MMS) and the like) address to the registered mobile station(s) through the associated WLAN system serving that (those) mobile station(s). The message is transferred through the converging layer 34 to the access point (AP) 36 servicing the mobile station, see FIG. 1.

BRIEF DESCRIPTION OF THE FIGURES

The present invention will be understood from a consideration of the accompanying Figures wherein like elements are designated by like numerals and, wherein.

DETAILED DESCRIPTION OF THE PREFERRED EMBODIMENTS

Figure 1:
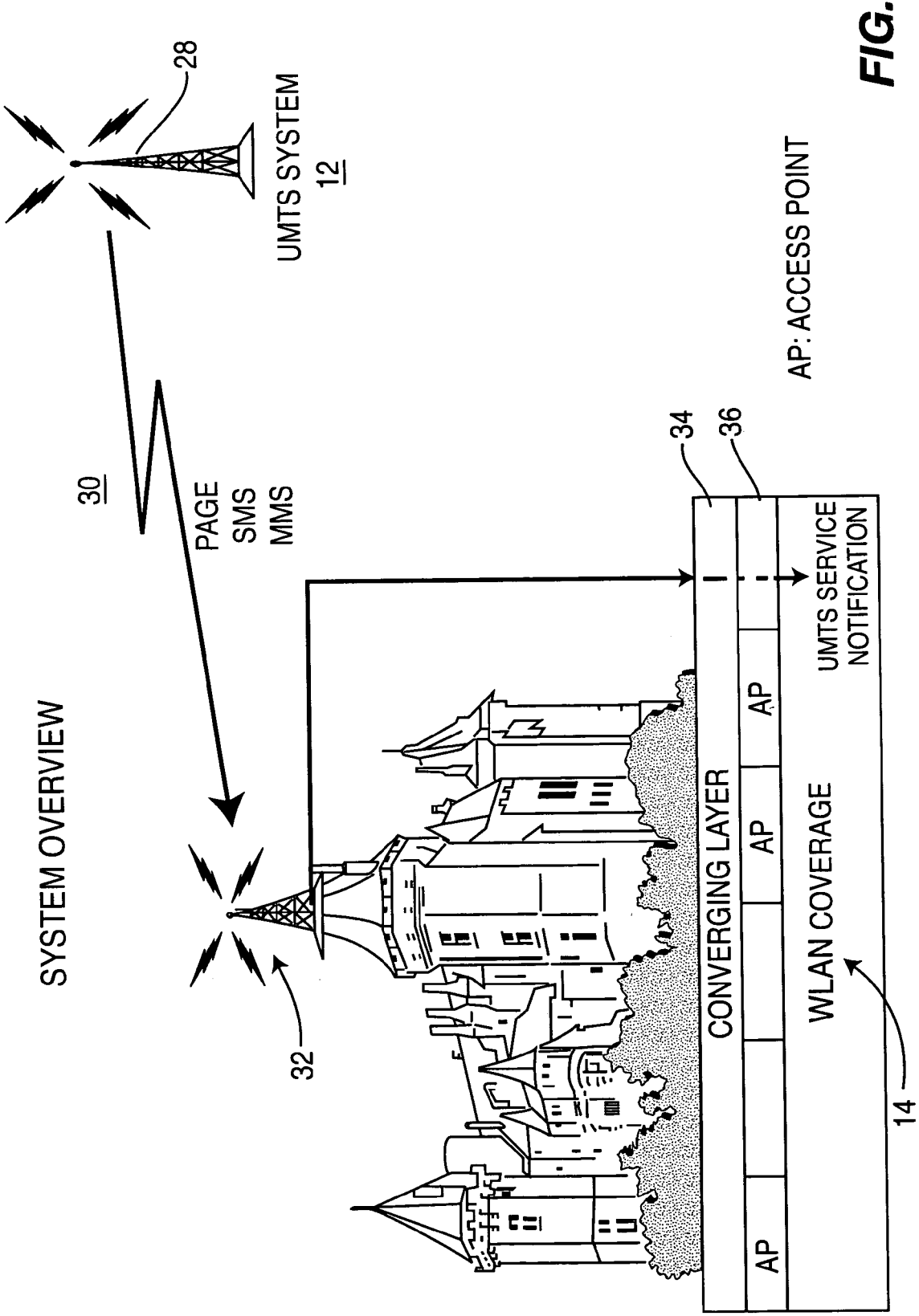
FIG. 1 is a diagram showing a UMTS system with an underlayed WLAN system and which is useful in describing the features and operation of the present invention.

FIG. 1 shows an arrangement 10 of a UMTS system 12 with an underlayed WLAN system 14. The arrangement of FIG. 1 will be described in conjunction with the technique for delivery of UMTS-based services when a mobile station is served by the WLAN system.

Figure 2:
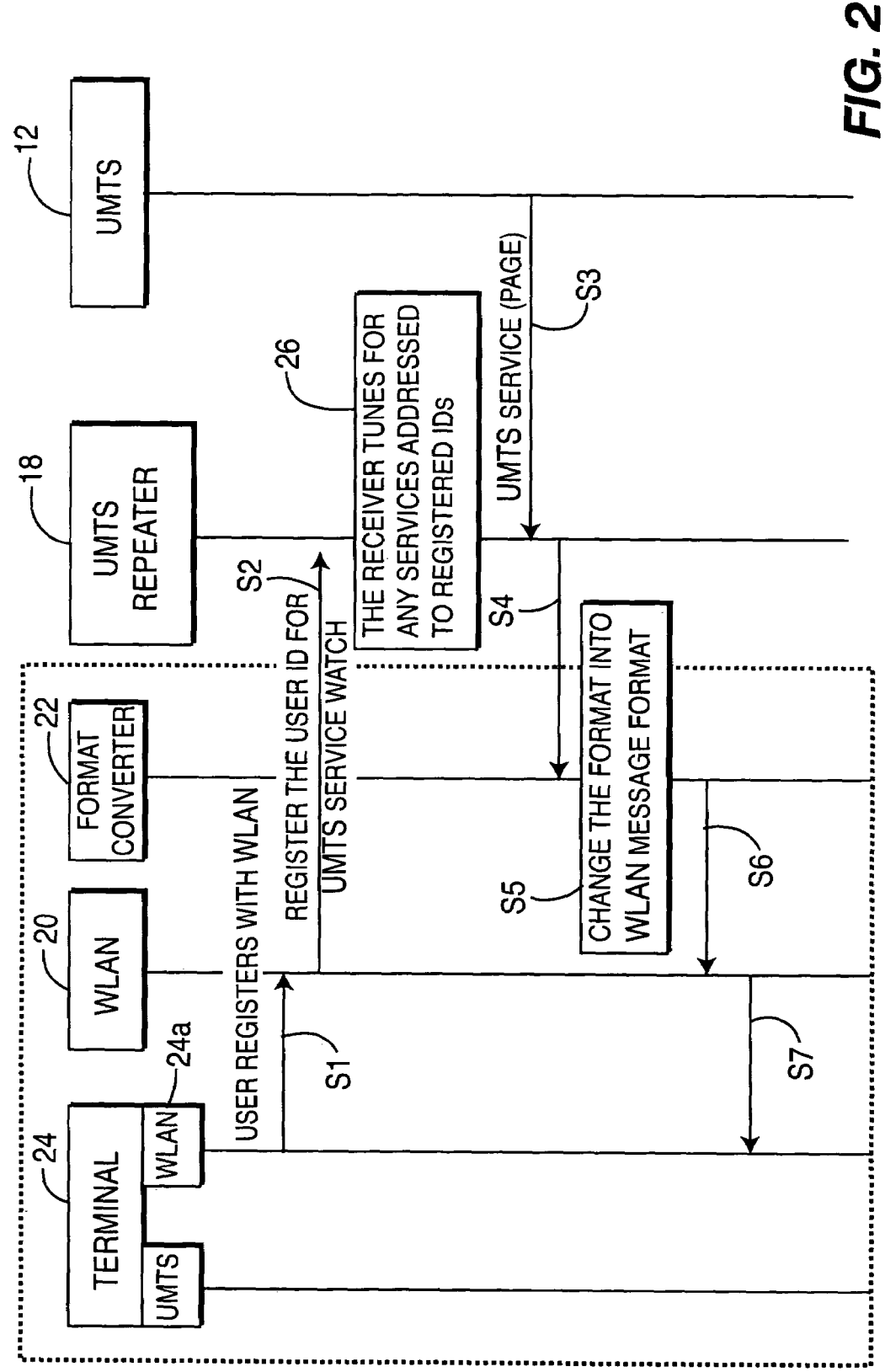
FIG. 2 is a flow diagram useful in explaining the manner of operation of the present invention.

Making reference to FIG. 2, and where appropriate, FIG. 1, there is shown an arrangement similar to that of FIG. 1.

Only one dual-mode mobile station 24 is shown for purposes of simplicity, it being understood that a plurality of such dual mode terminals may be serviced by the WLAN 14.

User terminal 24, when within the range in the WLAN environment 14 and operating in the WLAN mode 24a, registers with WLAN 20, at step S1. WLAN 20, at step S2, then registers, with UMTS repeater 18, the user identification (ID) of terminal 24 for the UMTS service watch, the user ID being transferred to UMTS repeater 18. The UMTS receiver 26 is tuned for any services addressed to registered IDs. When a UMTS service such as a page, short message service (SMS), multimedia message service (MMS) or the like is to be delivered, UMTS 12, at step S3, transfers such a service, in the example given, a page message, to UMTS repeater 18. The repeater 18, which includes a transmission tower 28 (see FIG. 1), transmits the page message over a radio channel 30 to the WLAN 20, at step S4. The WLAN format converter 22 converts the UMTS format of the page message into a WLAN message format, at step S5, having received the page message transmitted over the UMTS transmission tower 28 through wireless channel 30 and WLAN receiver antenna 32.

Format converter 22, at step S6, transfers the WLAN message format to WLAN 20 which, through converging layer 34 (FIG. 1), directs the message to the appropriate access point(s) to provide UMTS service notification over the WLAN coverage area 14, the broadcast message being transmitted to those registered users operating in the WLAN mode 24a, typically through a transmission antenna, not shown for purposes of simplicity.

The above procedure applies to the delivery of short message service (SMS), multimedia message services (MMS), broadcast and unidirectional multicast services.

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

What is claimed is:

1. A method employed by a wireless local area network (WLAN) for communicating messages from a universal mobile telecommunications system (UMTS) to a mobile station (UE) operating within said WLAN, comprising:
   said WLAN, responsive to registration of the UE:
   a) registering UMTS identification of the UE with the UMTS for UMTS service watch;
   b) receiving a UMTS service message intended for the UE directly from the UMTS over a radio channel between the UMTS and the WLAN; and
   c) converting the UMTS service message in an UMTS message format into a WLAN message format for transmission to the UE.

2. The method of claim 1 wherein the UMTS service message received at step (b) includes:
   receiving one of a paging message, short message service (SMS) and multimedia message service (MMS).

3. The method of claim 1 wherein step (c), further comprises:
   transferring the reformatted message to a given access point for transmission to the UE.

4. A wireless local area network (WLAN) for communicating message services to a mobile station (UE) operating in the wireless local area network (WLAN) from a universal mobile telecommunications system (UMTS), said WLAN comprising:
   an inter-working controller responsive to the UE for registering UMTS identification of the UE with the UMTS for UMTS service watch;
   a receiver for directly receiving a UMTS service message intended for the UE from said UMTS over a radio channel between the UMTS and the WLAN; and
   a format converter for converting the UMTS service message in an UMTS message format into an WLAN message format.

5. The apparatus of claim 4 wherein said WLAN further comprises:
   a transmitter for conveying the converted message to an access point (AP) associated with the WLAN.

6. The apparatus of claim 5 wherein said AP includes:
   a second transmitter to send the converted message service to said UE.

7. The apparatus of claim 4 wherein said
   inter-working controller directly conveys the UMTS identification to a UMTS repeater for registering the UE with a UMTS.

* * * * *